United States Patent [19]
McFadden

[11] Patent Number: 6,083,300
[45] Date of Patent: Jul. 4, 2000

[54] DUAL MODE AIR TREATMENT APPARATUS AND METHOD

[75] Inventor: David H. McFadden, Lexington, Mass.

[73] Assignee: Gas Research Institute, Chicago, Ill.

[21] Appl. No.: 09/139,784

[22] Filed: Aug. 25, 1998

[51] Int. Cl.[7] .................................................. B01D 53/06
[52] U.S. Cl. .................................. 95/113; 96/125; 96/150
[58] Field of Search ............................... 95/113; 96/125, 96/150

[56] References Cited

U.S. PATENT DOCUMENTS

| | | | |
|---|---|---|---|
| 2,286,920 | 6/1942 | Miller | 96/125 |
| 2,700,537 | 1/1955 | Pennington | 261/83 |
| 3,009,684 | 11/1961 | Munters . | |
| 3,398,510 | 8/1968 | Pennington | 96/125 |
| 3,686,832 | 8/1972 | Hori et al. | 96/125 |
| 3,774,374 | 11/1973 | Dufour et al. | 96/125 |
| 3,844,737 | 10/1974 | Macriss et al. | 95/113 |
| 4,093,435 | 6/1978 | Marron et al. . | |
| 4,180,126 | 12/1979 | Rush et al. | 165/59 |
| 4,398,927 | 8/1983 | Asher et al. | 95/113 |
| 4,474,021 | 10/1984 | Harband . | |
| 4,497,361 | 2/1985 | Hajicek . | |
| 4,668,249 | 5/1987 | Purdue . | |
| 4,841,733 | 6/1989 | Dussault et al. | 62/93 |
| 4,926,618 | 5/1990 | Ratliff . | |
| 5,167,679 | 12/1992 | Maekawa et al. . | |
| 5,373,704 | 12/1994 | McFadden . | |
| 5,423,187 | 6/1995 | Fournier . | |
| 5,435,150 | 7/1995 | Khelifa et al. . | |
| 5,548,970 | 8/1996 | Cunningham, Jr. et al. . | |
| 5,572,799 | 11/1996 | Masuyuki et al. . | |
| 5,661,983 | 9/1997 | Groten et al. | 62/271 |
| 5,727,394 | 3/1998 | Belding et al. | 62/94 |
| 5,817,167 | 10/1998 | DesChamps | 95/113 |

FOREIGN PATENT DOCUMENTS

| | | | |
|---|---|---|---|
| 57-188948 | 11/1982 | Japan | 96/125 |
| 1 551 647 | 8/1979 | United Kingdom | F24F 5/00 |

*Primary Examiner*—Duane S. Smith
*Attorney, Agent, or Firm*—Pauley Petersen Kinne & Fejer

[57] ABSTRACT

An apparatus and system, as well as corresponding methods of operation and treatment of air, are provided which make use of a rotatable desiccant bed such as to permit the effective and selective alternative reduction of humidity of incoming air or recovery of heat from air to be discarded.

17 Claims, 2 Drawing Sheets

DUAL MODE AIR TREATMENT APPARATUS AND METHOD

BACKGROUND OF THE INVENTION

This invention relates generally to air treatment and conditioning and, more particularly, to an apparatus, system and method such as may desirably alternatively reduce air humidity or facilitate heat energy recovery.

As the cost of various energy sources has increased, there is a need and demand that energy-using systems be more energy efficient and, consequently, desirably more economical. As will be appreciated, energy-efficient, economical air treatment has and is becoming a more significant aspect in residential property design. In general, wintertime air treatment costs can be minimized or reduced through the recovery of heat from air which ultimately is be exhausted or discarded. Summertime air treatment costs can, in turn, be minimized or reduced through the reduction of the humidity of treated air.

In view of the above, there is a need and a demand for an apparatus, system and method such as may effectively reduce air humidity, such as may be desired for air treatment during the summer season. Additionally, there is a need and a demand for an apparatus, system and method such as may effectively facilitate energy recovery, such as may be desired for air treatment during the winter season.

In particular, an apparatus and system such as may effectively and selectively alternatively reduce air humidity or facilitate heat energy recovery, such as may be desired for air treatment during summer and winter seasons, respectively, as well as corresponding methods of operation and treatment of air have apparent commercial benefits and have been and are desired and sought.

SUMMARY OF THE INVENTION

A general object of the invention is to provide improvements in the apparatus and methods of treating air.

A more specific objective of the invention is to overcome one or more of the problems described above.

The general object of the invention can be attained, at least in part, through a specifically disclosed variable, dual mode ventilator apparatus. The ventilator apparatus includes a partitioned housing which forms first and second parallel air treatment passageways in counterflow arrangement. Each of the first and second air treatment passageways have an inlet for intake of air to be treated and an outlet for exhaust of treated air.

The ventilator apparatus also includes, contained within the housing a rotatable desiccant bed. The rotatable desiccant bed has a selectable rate of rotation and forms a first sector in the first passageway and a second sector in the second passageway. The air to be treated in the first passageway contacts the first sector of the desiccant bed to form the treated air of the first passageway and the air to be treated in the second passageway contacts the second sector of the desiccant bed to form the treated air of the second passageway.

In accordance with a preferred embodiment of the invention, in a first mode of operation, the treated air of the first passageway is of lower humidity as compared to the corresponding air to be treated and the treated air of the second passageway is of higher humidity as compared to the corresponding air to be treated. In a second mode of operation, the treated air of the first passageway is cooler as compared to the corresponding air to be treated and the treated air of the second passageway is warmer as compared to the corresponding air to be treated.

The prior art fails to show, suggest or provide means for the treatment of air and corresponding methods of air treatment which are as effective and as efficient as desired in reducing the humidity of incoming air, such as may be desired when treating air of high relative humidity as may be common during the summer season, and in preheating makeup air, as may be desired during the winter season.

The invention further comprehends a method of ventilator operation. The ventilator includes first and second parallel air treatment passageways in counterflow arrangement. Each of the first and second air treatment passageways have an inlet for intake of air to be treated and an outlet for exhaust of treated air. The ventilator includes a rotatable desiccant bed having a selectable rate of rotation. The rotatable desiccant bed forms a first sector in the first passageway and a second sector in the second passageway, whereby the air to be treated in the first passageway contacts the first sector of the desiccant bed to form the treated air of the first passageway and the air to be treated in the second passageway contacts the second sector of the desiccant bed to form the treated air of the second passageway.

A method of operation of such a ventilator, in accordance with one preferred embodiment of the invention, includes first and second modes of operation. The first mode of operation includes a step of contacting the first sector of the desiccant bed with high humidity air to remove moisture from the air to be treated to form dehumidified treated air. Such a first mode of operation also includes a step of contacting the second sector of the desiccant bed with air to remove moisture from the desiccant and to form treated air of increased moisture content. The second mode of operation includes a step of contacting the first sector of the desiccant bed with air to be treated of a first selected temperature to heat the desiccant and to form treated air of reduced temperature, as compared to the air to be treated. Such a second mode of operation also includes a step of contacting the second sector of the desiccant bed with air to be treated of a second selected temperature to form treated air of increased temperature as compared to the corresponding air to be treated.

As used herein, references to "parallel passageways" are to be understood to refer to passageways which are spatially in a general parallel relationship.

Other objects and advantages will be apparent to those skilled in the art from the following detailed description taken in conjunction with the appended claims and drawings.

DETAILED DESCRIPTION OF THE INVENTION

The present invention, as is described in more detail below, provides an improved apparatus, system and method for treating air. While the invention may, in accordance with the broader practice thereof, find applicability in the treatment of air such as may be desired in the heating, ventilating and air conditioning of various or selected residential, commercial and at least certain industrial spaces, the invention is perceived at least initially to have particular applicability to air treatment for residential applications. In particular, the invention provides an apparatus, system and method for treating air such as may desirably serve to alternatively reduce the humidity of incoming air to the apparatus or system, such as may be desired when treating air of high relative humidity as may be common during the summer season, and in preheating makeup air, as may be desired during the winter season as may commonly be experienced in various residential applications.

Figure 1:
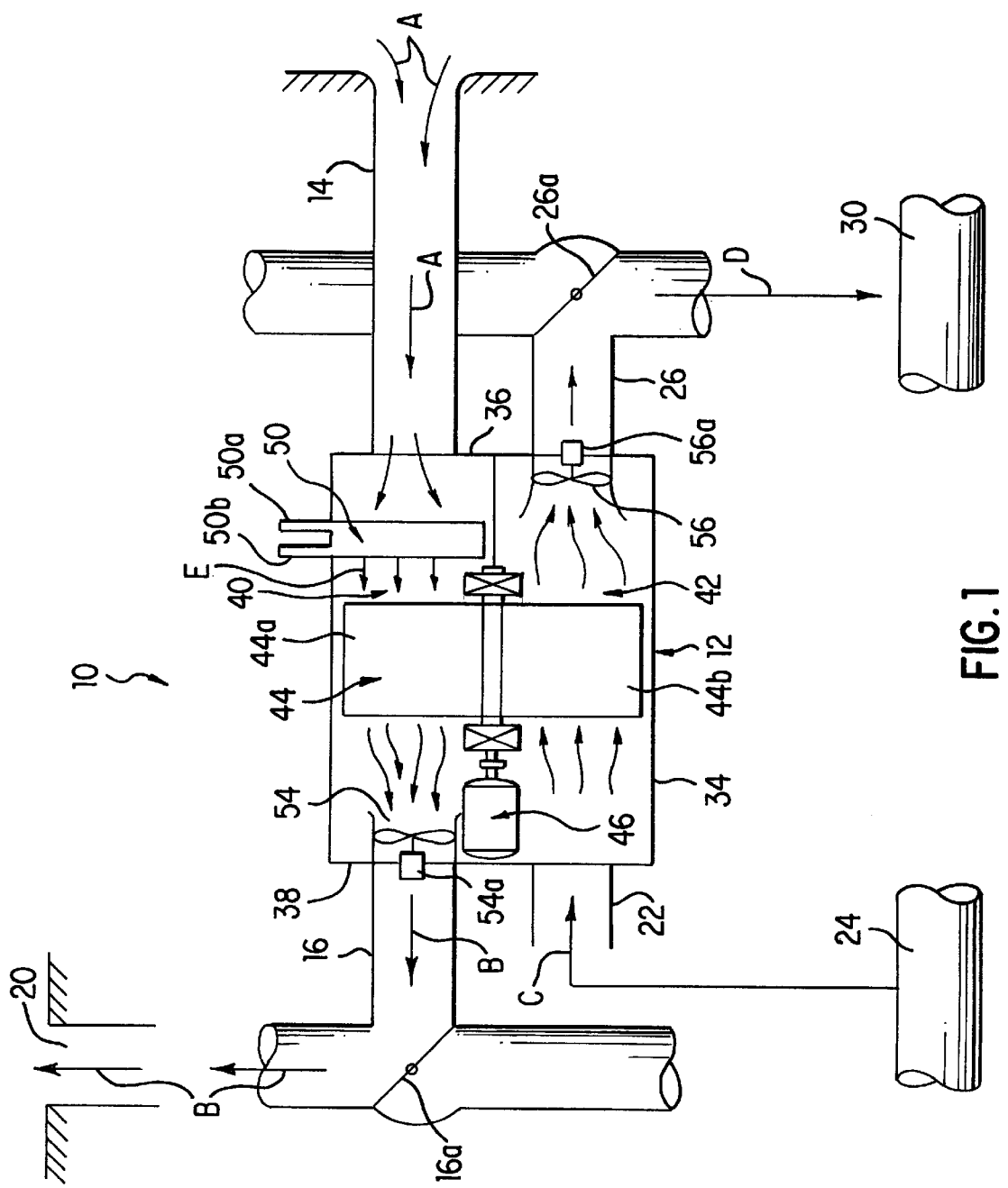
FIG. 1 is a simplified fragmentary schematic drawing of an air treatment system incorporating a variable, dual mode ventilator apparatus in accordance with a one embodiment of the invention and shown in a first mode of operation.

Turning to FIG. 1, there is illustrated an air treatment system 10 which incorporates a variable, dual mode ventilator apparatus, generally designated by the reference numeral 12, in accordance with a one embodiment of the invention and shown in a first mode of operation. As will be described in greater detail below, in such first mode of operation, the system 10 and the ventilator apparatus 12 permit operation such as may be desired to reduce the humidity of incoming air, such as may be desired in warm weather or summertime operation or practice of the invention.

The system 10 includes an outdoor air inlet conduit 14 joined, fastened or otherwise connected to or with the ventilator 12 and wherethrough outdoor air, such as signified by the arrows "A", is introduced into the ventilator 12. Also joined, fastened or otherwise connected to or with the ventilator 12 is an outlet conduit 16 for the passage of the appropriately treated outdoor air, such as signified by the arrows "B". In accordance with this first mode of operation and as shown in FIG. 1, such treated air may appropriately be exhausted to the outdoor environment, such as via an outdoor exhaust outlet 20.

The system 10 further includes an inlet conduit 22 wherethrough air to be treated such as from a return duct 24 from the space for which air is being treated (and which air to be treated is signified by the arrow "C") is introduced into the ventilator 12. The system 10 also includes an outlet conduit 26 for the passage of the appropriately treated return duct air, such as signified by the arrow "D". In accordance with this first mode of operation and as shown in FIG. 1, such treated return duct air may appropriately be conducted or conveyed to a distribution duct 30 for subsequent conveyance and distribution to or in the space being air treated.

Focus is now directed to the ventilator 12, itself. The ventilator 12 includes a cabinet or other form of housing 34 having opposite first and second ends, 36 and 38, respectively. The housing 34 is divided or otherwise partitioned to form first and second parallel air treatment passageways, 40 and 42, respectively, in counterflow arrangement. In particular, each of the passageways 40 and 42 generally spans the housing 34 between the first end 36 the opposite second end 38.

As shown, the first air treatment passageway 40, at the housing first end 36, is connected to the outdoor air inlet conduit 14 and, at the housing second end 38, is connected to the outlet conduit 16. The second air treatment passageway 42, at the housing second end 38, is connected to the inlet conduit 22 and, at the housing first end 36, is connected to the outlet conduit 26.

Within the housing 34 there is contained or housed a rotatable desiccant bed 44, such as in the form of a wheel. The rotatable desiccant bed 44 desirably contains a mass of thermally regeneratable sorbent or desiccant material such as silica gel or, alternatively, a zeolite material, for example. The rotatable desiccant bed 44 may be a honeycomb desiccant bed or a segmented carousel desiccant bed, both of which are known in the art. The desiccant bed 44 forms a first sector 44a in the first passageway 40 and a second sector 44b in the second passageway 42.

As shown, the desiccant bed wheel 44 is joined or mounted to a variable speed drive shaft assembly 46, such as is known in the art, to permit rotation of the bed wheel 44 within the housing 34 at a predetermined selected speed. As will be described in greater detail below, as the desiccant bed wheel 44 rotates, desiccant material moves from being in the first air treatment passageway 40 to being in the second air treatment passageway 42.

Within the housing 34, in the first air treatment passageway 40, there is contained or housed a heat exchanger device. As will be appreciated by those skilled in the art, such heat exchanger device can take various forms including: an electric heating element, a natural gas combustion heat exchanger or, as shown, a hot water heat exchanger 50. Thus, the broader practice of the invention is not limited by the particular form of the heat exchanger device utilized.

The hot water heat exchanger 50 includes a hot water inlet, such as generally designated by the reference numeral 50a, and a corresponding water outlet, such as generally designated by the reference numeral 50b. In accordance with a typical practice of such first mode of operation, the heat exchanger 50 serves to heat the incoming outdoor air, signified by the arrows A, to form heated air, signified by the arrows "E". The incoming outdoor air A is generally heated to permit or facilitate the desired drying function, such as described below, for which the heated air E is subsequently applied. In practice, such air is desirably heated to a temperature of at least about 140° F. to about 180° F.

The heated air E is passed into contact with the desiccant bed first sector 44a. With such contact, the contacting air serves to remove moisture from the desiccant material of the first sector 44a and to form a first passageway treated air B, having increased moisture content. As shown, such air may appropriately be discharged or exhausted such as to the outdoor environment, such as via the outdoor exhaust outlet 20.

In the normal practice of such mode of operation, the desiccant bed 44 desirably rotates in a relatively slow manner to better permit the more complete removal of moisture from the desiccant material by means of the heated air E. In practice, the rotation rate of the desiccant bed wheel 44 is a function of the associated air flow rates as well as the configuration and desiccant loading of the wheel, including the type, form and amount of desiccant. For example, at normal air flow rates, a rotation rate of about 4 to about 20 revolutions per hour would normally be expected to provide or result in sufficient removal of moisture or water vapor from the desiccant material.

As will be appreciated, the resulting "dry" desiccant material is rotated to form the second desiccant bed sector 44b in the second passageway 42. In this mode of operation, the air to be treated C is passed into contact with the second desiccant bed sector 44b such that moisture is adsorbed by the desiccant material such that the treated air D has a reduced moisture content, e.g., the air passing through the second passageway 42 has been dehumidified. Such dehumidified treated air, as shown, is subsequently passed to the distribution duct 30 such as for subsequent desired distribution to or in the space for which air treatment is desired.

As shown, the ventilator 12 may desirably include: a fan 54 and an associated motor 54a such as may serve to facilitate the drawing and passage of air into and through the first passageway 40 and a fan 56 and an associated motor 56a such as may serve to facilitate the drawing and passage of air into and through the second passageway 42. The ventilator 12 may also desirably contain or include associated seals (not specifically shown) to minimize leakage between the passageways 40 and 42. Such seals may, as is known, include a perimeter and diametral seal about or at the desiccant bed wheel 44.

In addition, the first and second passageway outlet conduits, 16 and 26, respectively, may desirably include a damper or like device, represented by the reference identifications 16a and 26a, respectively. As will be appreciated, the system inclusion of such dampers can serve to facilitate desired gas flow direction within the system 10 as well as better permit or facilitate conversion of such a system 10 between alternative mode or modes of operation, such as described herein.

Figure 2:
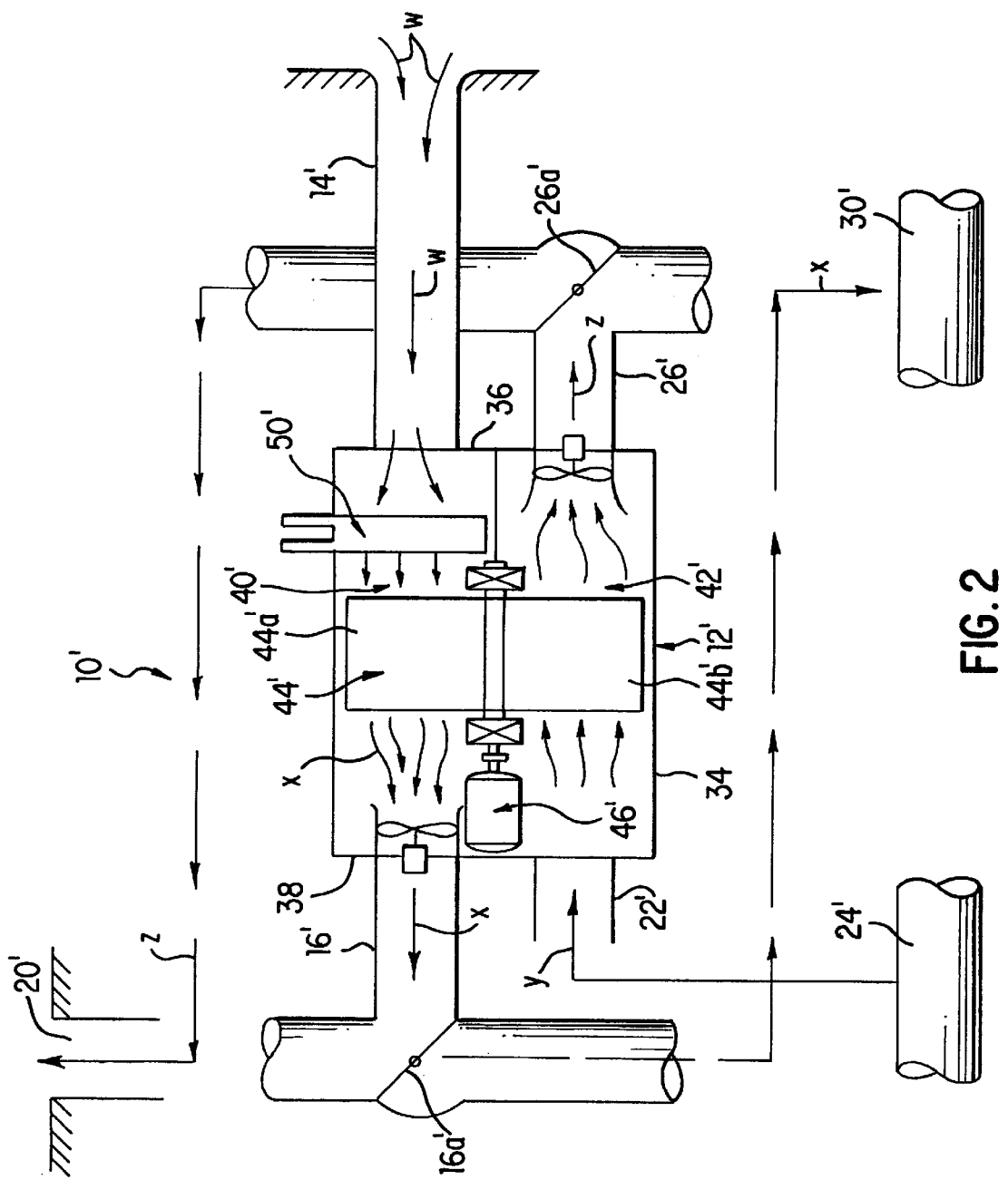
FIG. 2 is a simplified fragmentary schematic drawing of the air treatment system of FIG. 1 but now shown in accordance with a second mode of operation of the invention.

Turning to FIG. 2, there is illustrated an air treatment system, generally designated by the reference numeral 10'. As described in greater detail below, the air treatment system 10' is generally composed of the same components, described above relative to the system 10, but now arranged in accordance with an alternative second mode of operation. Such alternatively arranged, similar components in the second mode of operation, are generally represented by the same reference numeral as used relative to the system 10 in the first mode of operation, shown in FIG. 1, but with the addition of a prime, "'", to such numeral. For example, the system 10' desirably includes the same dual mode ventilator apparatus described above but here shown in a second mode of operation and generally designated by the reference numeral 12'.

As will be described in greater detail below, in such second mode of operation, the system 10' and the ventilator apparatus 12' permit operation such as may be desired to one or more permit, facilitate or improve heat recovery from air such that might otherwise may be discarded or exhausted from an air treated space, such as may be desired in cold weather or wintertime operation or practice of the invention.

The system 10' includes the outdoor air inlet conduit 14' joined, fastened or otherwise connected to or with the ventilator 12' and wherethrough outdoor air, such as signified by the arrows "W", is introduced into the ventilator 12'. Also joined, fastened or otherwise connected to or with the ventilator 12' is the outlet conduit 16' for the passage of the appropriately treated outdoor air, such as signified by the arrows "X". In accordance with this second mode of operation and as shown in FIG. 2, such treated air may appropriately be passed to a distribution duct 30', such as through the manipulation of the damper 16'.

The system 10' further includes an inlet conduit 22' wherethrough air to be treated from a return duct 24' from the space for which air is being treated (and which air to be treated is signified by the arrow "Y") is introduced into the ventilator 12' and an outlet conduit 26' for the passage of the appropriately treated return duct air, such as signified by the arrows "Z". In accordance with this second mode of operation, through the manipulation of the damper 26' and as shown in FIG. 2, such treated return duct air may appropriately be exhausted to the outdoor environment, such as via the outdoor exhaust outlet 20'.

As identified above, the structural components of the ventilator 12' shown in FIG. 2 are generally the same as shown in the ventilator 12 shown in FIG. 1 and described above but now in general accordance with an alternative second mode of operation. Thus, regardless of the mode of operation, the ventilator of the invention desirably includes a cabinet or other form of housing 34 having opposite first and second ends, 36 and 38, respectively. The housing 34 is divided or otherwise partitioned to form first and second parallel air treatment passageways which, in the second mode of operation are respectively designated by the reference numerals 40' and 42', respectively, in counterflow arrangement. In particular, each of the passageways 40' and 42' generally spans the housing 34 between the first end 36 the opposite second end 38.

As shown, the first air treatment passageway 40', at the housing first end 36, is connected to the outdoor air inlet conduit 14' and, at the housing second end 38, is connected to the outlet conduit 16'. The second air treatment passageway 42', at the housing second end 38, is connected to the inlet conduit 22' and, at the housing first end 36, is connected to the outlet conduit 26'.

Within the housing 34 there is contained or housed the rotatable desiccant bed 44', forming a first sector 44a' in the first passageway 40' and a second sector 44b' in the second passageway 42'.

As shown, the desiccant bed wheel 44' is joined or mounted to the variable speed drive shaft assembly 46' such as to permit rotation of the bed 44' within the housing 34 at a predetermined selected speed.

In the assembly 10', the heat exchanger 50' may desirably be rendered generally inactive or inert for temperature alteration. For example, a hot water heat exchanger 50' can be drained to render such heat exchanger device generally inactive or inert for temperature alteration. If desired, such as in the event of very cold incoming air (e.g., air of a temperature of about 10° F. or less), the heat exchanger 50' can be used to effect preheating of the air passing therethrough.

In accordance with a typical practice of such second mode of operation, the desiccant wheel 44' is used generally as a rotating regenerative heat exchanger. More specifically, relatively warm return duct air "Y" is passed via the conduit 22' into the second passageway 42' and into contact with the desiccant bed second sector 44b'. The relatively warm return duct air "Y" acts to heat the desiccant wheel sector 44b' and form treated air "Z". As shown such treated air may appropriately be discharged or exhausted to the outdoor environment, such as via the outdoor exhaust outlet 20'.

As will be appreciated, the resulting "heated" desiccant wheel is rotated to form the first desiccant sector 44a' in the first passageway 40'. In this mode of operation, the air to be treated W is passed into contact with the first desiccant bed sector 44a' such that heat is transferred to the air being treated Z. The warmed air, as shown, is subsequently passed to the distribution duct 30' such as for subsequent desired distribution to or in the space for which air treatment is desired.

In the normal practice of such mode of operation, the desiccant bed 44' desirably rotates in a relatively faster manner. In practice, the rotation rate of the desiccant bed wheel 44' is again generally a function of the associated air flow rates as well as the configuration and desiccant loading of the wheel, including the type, form and amount of desiccant. The desiccant bed wheel is typically rotated at a significantly higher speed when used to primarily to convey heat, as in the mode illustrated in FIG. 2, as compared to when used in for humidity control, as described above and illustrated in FIG. 1. For example, at normal air flow rates, a rotation rate of about 5 to about 20 revolutions per minute would normally be expected to provide or result in a desirable heat transfer effectiveness of at least about 70% or more.

As with the system 10 in the first mode of operation shown in FIG. 1 and described above, fans 54 and 56 and associated motors 54a and 56a, respectively, can serve to facilitate the drawing and passage of air into and through the passageways 40 and 42, respectively.

While the broader practice of the invention is not necessarily so limited, it will be understood that the invention can desirably be practiced in the described alternative modes of operation wherein the same outdoor exhaust outlet, outdoor inlet, return duct and/or distribution duct are utilized in both modes as such use may simply required piping and associated connections.

Further, the ventilator apparatus used in these alternative modes remains generally the same except that in the heat recovery mode described above, the heat exchange device contained there within is drained such as to render the heat exchange device generally inactive or inert for temperature alteration.

The above-described invention provides an apparatus and system such as may effectively and selectively alternatively reduce air humidity or facilitate heat energy recovery, such as may be desired for air treatment during summer and winter seasons, respectively, as well as corresponding methods of operation and treatment of air.

As will be appreciated, the variable, dual mode ventilator apparatus of the invention can desirably provide a compact modular unit well suited for installation and use in or in association with various air treatment systems such as may be present in various commercial and residential applications. Further, the apparatus, system and method of the invention can serve to provide significant health and comfort benefits relating to or resulting from the treatment of air. Still further, the reduced energy requirements resulting through the practice of the invention can have important ramifications in the providing of energy efficient air treatment systems.

The invention illustratively disclosed herein suitably may be practiced in the absence of any element, part, step, component, or ingredient which is not specifically disclosed herein.

While in the foregoing detailed description this invention has been described in relation to certain preferred embodiments thereof, and many details have been set forth for purposes of illustration, it will be apparent to those skilled in the art that the invention is susceptible to additional embodiments and that certain of the details described herein can be varied considerably without departing from the basic principles of the invention.

What is claimed is:

1. A variable, dual mode ventilator apparatus having first and second modes of operation, said apparatus comprising:
    a partitioned housing forming first and second parallel air treatment passageways in counterflow arrangement, with each of the first and second air treatment passageways having an inlet for intake of air to be treated and an outlet for exhaust of treated air; and
    a rotatable desiccant bed having a selectable rate of rotation, said rotatable desiccant bed contained within said housing, wherein the rate of rotation of said desiccant bed is selected dependent on the mode of operation of said apparatus, said rotatable desiccant bed forming a first sector in the first passageway and a second sector in the second passageway, whereby the air to be treated in the first passageway contacts the first sector of said desiccant bed to form the treated air of the first passageway and the air to be treated in the second passageway contacts the second sector of said desiccant bed to form the treated air of the second passageway;
    the apparatus is adaptable for conversion between the first and the second modes of operation;
    wherein, in the first mode, the treated air of the first passageway is of lower humidity as compared to the corresponding air to be treated and the treated air of the second passageway is of higher humidity as compared to the corresponding air to be treated and
    wherein, in the second mode, the treated air of the first passageway is cooler as compared to the corresponding air to be treated and the treated air of the second passageway is warmer as compared to the corresponding air to be treated.

2. The apparatus of claim 1 additionally comprising a heat exchanger device positioned in the first passageway between the inlet and said desiccant bed.

3. The apparatus of claim 1 wherein at least one of the first and second passageways includes a fan positioned to facilitate the drawing and passage of air into and through the respective passageway.

4. The apparatus of claim 1 wherein each of the first and second passageways includes a fan positioned to facilitate the drawing and passage of air into and through the respective passageway.

5. The apparatus of claim 1 wherein in the first mode the desiccant bed is rotated at a speed of about 4 to about 20 revolutions per hour.

6. The apparatus of claim 1 wherein in the second mode the desiccant bed is rotated at a speed about 5 to about 20 revolutions per minute.

7. A temperature and humidity control system comprising:
    a variable, dual mode ventilator apparatus including:
        a partitioned housing forming first and second parallel air treatment passageways in counterflow arrangement, with each of the first and second air treatment passageways having an inlet for intake of air to be treated and an outlet for exhaust of treated air; and
        a rotatable desiccant bed having a selectable rate of rotation, said rotatable desiccant bed contained within said housing, said rotatable desiccant bed forming a first sector in the first passageway and a second sector in the second passageway, whereby the air to be treated in the first passageway contacts the first sector of said desiccant bed to form the treated air of the first passageway and the air to be treated in the second passageway contacts the second sector of said desiccant bed to form the treated air of the second passageway;
        wherein in a first mode, the treated air of the first passageway is of lower humidity as compared to the corresponding air to be treated and the treated air of the second passageway is of higher humidity as compared to the corresponding air to be treated,
        wherein, in a second mode, the treated air of the first passageway is cooler as compared to the corresponding air to be treated and the treated air of the second passageway is warmer as compared to the corresponding air to be treated, and
        wherein the outlet of the first passageway is connected to a first dampered conduit and the outlet of the second passageway is connected to a second dampered conduit, said first and second dampered conduits being positionable for conversion of the system between the first and second modes of operation.

8. The temperature and humidity control system of claim 7 wherein said ventilator apparatus additionally comprises a heat exchanger device positioned in the first passageway between the inlet and the desiccant bed and wherein each of the first and second passageways includes a fan positioned to facilitate the drawing and passage of air into and through the respective passageway.

9. A method of operating a ventilator which includes first and second parallel air treatment passageways in counter-flow arrangement, with each of the first and second air treatment passageways having an inlet for intake of air to be treated and an outlet for exhaust of treated air; and a rotatable desiccant bed having a selectable rate of rotation, the rotatable desiccant bed forming a first sector in the first passageway and a second sector in the second passageway, whereby the air to be treated in the first passageway contacts the first sector of the desiccant bed to form the treated air of the first passageway and the air to be treated in the second passageway contacts the second sector of the desiccant bed to form the treated air of the second passageway, said method including;
  a) a first mode of operation comprising the steps of:
    contacting the first sector of the desiccant bed with high humidity air to remove moisture from the air to be treated to form dehumidified treated air, and
    contacting the second sector of the desiccant bed with air to remove moisture from the desiccant and to form treated air of increased moisture content and
  b) a second mode of operation comprising the steps of:
    contacting the first sector of the desiccant bed with air to be treated of a first selected temperature to heat the desiccant and to form treated air of reduced temperature, as compared to the air to be treated, and
    contacting the second sector of the desiccant bed with air to be treated of a second selected temperature to form treated air of increased temperature as compared to the corresponding air to be treated.

10. The method of claim 9 wherein at least one of the first and second modes of operation additionally comprises the step of rotating the desiccant bed at a predetermined selected speed dependent on the mode of operation.

11. The method of claim 10 wherein each of the first and second modes of operation additionally comprises the step of rotating the desiccant bed at a predetermined selected speed dependent on the mode of operation.

12. The method of claim 10 wherein the first mode of operation additionally comprises the step of rotating the desiccant bed at a rate of about 4 to about 20 revolutions per hour.

13. The method of claim 10 wherein the second mode of operation additionally comprises the step of rotating the desiccant bed at a rate of about 5 to about 20 revolutions per minute.

14. The method of claim 13 wherein the second mode of operation results in a heat transfer effectiveness of at least about 70%.

15. The method of claim 9 wherein the first mode of operation additionally comprises the step of preheating the air used to remove moisture from the desiccant.

16. The method of claim 15 wherein the air used to remove moisture from the desiccant is preheated to a temperature of at least about 140° F. to about 180° F.

17. The apparatus of claim 1 wherein the rate of rotation of said desiccant bed is greater when said apparatus is in the second mode of operation as compared to the rate of rotation of said desiccant bed when said apparatus is in the first mode of operation.

* * * * *